Figure 1:
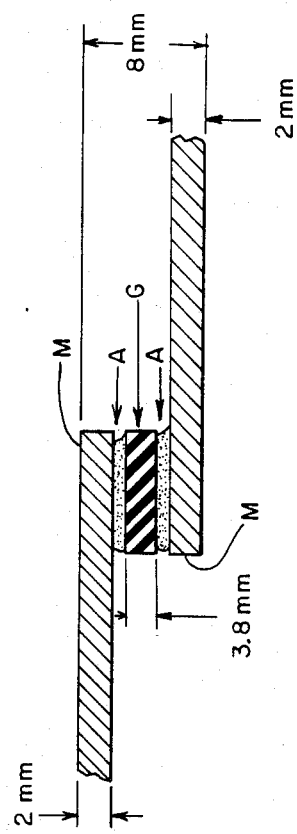

United States Patent [19]

Caporiccio et al.

[11] Patent Number: 4,612,351

[45] Date of Patent: Sep. 16, 1986

[54] FLUOROELASTOMERIC COMPOSITIONS BASED ON VINYLIDENE FLUORIDE, CONTAINING SMALL AMOUNTS OF CHLOROTRIFLUOROETHYLENE, HAVING A HIGH ADHESION TO METALS IN THE VULCANIZED STATE

[75] Inventors: Gerardo Caporiccio; Enrico Monza, both of Milan; Piergiorgio Bonardelli, Brescia; Giovanni Moggi; Gianna Cirillo, both of Milan, all of Italy

[73] Assignee: Montedison S.p.A., Milan, Italy

[21] Appl. No.: 626,204

[22] Filed: Jun. 29, 1984

[30] Foreign Application Priority Data

Jun. 30, 1983 [IT] Italy .............................. 21865 A/83
May 23, 1984 [IT] Italy .............................. 21050 A/84

[51] Int. Cl.[4] ................... C08F 214/22; C08F 214/24; C08F 214/28; C08L 27/16

[52] U.S. Cl. ..................................... 525/199; 526/249

[58] Field of Search ................ 525/199; 526/250, 254, 526/249, 255, 253

[56] References Cited

U.S. PATENT DOCUMENTS

| | | | |
|---|---|---|---|
| 3,531,432 | 9/1970 | Graver | 525/199 |
| 3,769,371 | 10/1973 | Nersasian | 525/199 |
| 4,094,949 | 6/1978 | Yokokawa et al. | 525/199 |
| 4,115,481 | 9/1978 | Finlay et al. | 525/199 |
| 4,423,192 | 12/1983 | Van Lang et al. | 525/199 |

*Primary Examiner*—Allan M. Lieberman

[57] ABSTRACT

Fluoroelastomeric compositions based on vinylidene fluoride, having a high adhesion to metals in the vulcanized state, and characterized in that they contain small amounts of chlorotrifluoroethylene which is present as a comonomer of an elastomeric copolymer of vinylidene fluoride.

4 Claims, 1 Drawing Figure

FLUOROELASTOMERIC COMPOSITIONS BASED ON VINYLIDENE FLUORIDE, CONTAINING SMALL AMOUNTS OF CHLOROTRIFLUOROETHYLENE, HAVING A HIGH ADHESION TO METALS IN THE VULCANIZED STATE

BACKGROUND OF THE INVENTION

This invention relates to fluoroelastomeric compositions based on vinylidene fluoride, having a high adhesion to metals in the vulcanized state, and characterized in that they contain a minor amount of chlorotrifluoroethylene which is present as a comonomer of an elastomeric copolymer of vinylidene fluoride.

The fluoroelastomers with a high fluorine content have generally found a wider and wider utilization in the fields in which a high chemical stability and an excellent resistance to temperatures of 260° C. for continual use are required.

In a few of these utilizations, for example in the field of the sealing on rotary shafts accomplished by means of oil retaining rings, besides the characteristics which are typical of these elements, which are broadly described in literature [for example in Rubb. Ch. Tec. Vol. 55, page 908 (1982)], it is absolutely necessary that between the elastomer, constituting the sealing element of the gasket, and the metal insert, a perfect adhesion characterized by high adhesion coefficient values should be attained.

Therefore, there is the need for some manufactured articles vulcanized from fluoroelastomers to reach a satisfactory vulcanization rate and processing safety, a high metal-to-rubber adhesion which, by remaining unaltered even at high temperatures, renders the vulcanized articles suitable for being used also under the most severe working conditions.

THE PRESENT INVENTION

The fluoroelastomeric compositions according to this invention can be prepared according to one of the two alternative methods described hereinafter.

According to the first method, an elastomeric copolymer of chlorotrifluoroethylene (6–81% by weight), of vinylidene fluoride (18–71% by weight) and optionally of hexafluoropropene (0–41% by weight) and/or tetrafluoroethylene (0–49% by weight), hereinafter referred to as copolymer A, is mixed with an elastomeric copolymer B based on vinylidene fluoride (26–72% by weight), hexafluoropropene (25–44% by weight) and tetrafluoroethylene (0–36% by weight). The content of copolymer A in the total fluoroelastomeric compositions ranges from 1.3 to 30% by weight and is such that the chlorotrifluoroethylene units are preferably in the range of from 1 to 10% by weight, calculated on the total.

Preferably, the content of $CFCl=CF_2$ units ranges from 1% to 2.7% by weight referred to the total polymeric mixture. For copolymer A, the preferred compositions, by weight are: $CH_2=CF_2$ from 46% to 64%, $CF_2=CFCl$ from 12 to 49%, $C_3F_6$ from 0 to 42%, $C_2F_4$ from 0 to 32%. For elastomeric copolymer B of the type $CH_2=CF_2/C_3F_6$ the preferred compositions are by weight: $CH_2=CF_2$ from 59% to 66% and $C_3F_6$ from 41 to 34%, while for the elastomeric copolymer of type $CH_2=CF_2/C_3F_6/C_2F_4$ the preferred compositions are by weight: $CH_2=CF_2$ from 32 to 51%, $C_3F_6$ from 29 to 41%, $C_2F_4$ from 17 to 30%.

By means of the second method, the fluoroelastomeric composition according to the invention is preferred by employing a single fluoroelastomeric component, hereinafter referred to as fluoroelastomer C and consisting of a copolymer of vinylidene fluoride (37 to 73% by weight), hexafluoropropene (22 to 41% by weight), chlorotrifluoroethylene (0.6 to 7.5% by weight), tetrafluoroethylene (0 to 37% by weight).

The best results are obtained with $CF_2=CFCl$ contents of from 1 to 3.8% by weight.

In both cases, if the chlorofluoroethylene content is below the minimum values indicated hereinabove, the vulcanizate does not exhibit satisfactory adhesion values, while if the $CF_2=CFCl$ content is above the maximum limits indicated hereinabove for both cases, though obtaining high adhesion values, some drawbacks such as fouling of the molds and worsening of the vulcanized elastomer's properties of chemical and thermal stability may occur.

The first method indicated herein offers the advantage of permitting to utilize, as basic fluoroelastomer, a vinylidene fluoride fluoroelastomer of the conventional type, imparting to it the desired value of adhesion to metals by admixture with a small amount of a fluoroelastomer having a high $CF_2=CFCl$ content.

Copolymers A according to the present invention are preferably prepared under the polymerization-in-emulsion conditions, in the presence of a radicalic starter. Suitable radical starters are the alkaline persulphates, perborates and percarbonates. It is also possible to employ a combination of peroxy starters with reducers, such as sulphites, bisulphites, metabisulphites, thiosulphates, phosphites or hyposulphites of alkaline metals or of ammonium, or copper (I) salts, Fe (II) salts, silver salts and other easily oxidizable metal salts. It is possible to use also organic radical starters and to operate in the presence of surfactants such as Na-laurylsulphate and ammonium perfluoro-octanoate. Of course, a surfactant may be used also when the copolymerization is carried out with an inorganic starter.

The presence of a chain transfer may be useful during the polymerization in emulsion.

The copolymer obtained by copolymerization in emulsion can be isolated from the latex according to conventional methods, for example coagulation with an electrolyte or by freezing, followed by filtration, washing and drying.

The reaction providing the polymer may be also conducted in mass or in an organic liquid such as e.g. a chlorofluorohydrocarbon (freon 113 or 114). It is preferable that the organic liquid present should not act as a chain transfer under the polymerization conditions; by consequence, Freon 114 is preferable to Freon 113.

During the copolymer preparation, the reaction mixture is preferably heated in a pressure reactor, previously "washed" with an inert gas, to temperatures ranging from 45° to 135° C. and pressures of from 4 to 40 kg/cm².

Copolymers A of chlorotrifluoroethylene according to the present invention exhibit, in most cases, an inherent viscosity ranging from 0.2 to 1.5 dl/g. The inherent viscosity of these polymers can be determined at 30° C. in solvents such as, for example, methylethylketone, dimethylformamide, tetrahydrofuran, etc.

The Mooney viscosity of the copolymer ranges, in most cases, from 10 to 160, operating at 100° C. with rotor L according to ASTM D 1646 standards.

The copolymers of type A according to this invention are generally preparable conforming to polymerization methods which are well known for the elastomers based on vinylidene fluoride and broadly described in literature (U.S. Pat. No. 2,968,649, U.S. Pat. No. 3,051,677, U.S. Pat. No. 3,053,818, Encyclopedia of Chemical Technology, Kirk-Othmer, vol. 8, 3rd ed., pages 500-515 (1979)), taking care to introduce the desired amount of chlorotrifluoroethylene into the monomeric mixture. Always operating according to what is described hereinbefore, it is possible to obtain fluoroelastomers of group B by working in the absence of chlorotrifluoroethylene.

Fluoroelastomer C according to the present invention is obtainable by means of polymerization methods known for the elastomers based on vinylidene fluoride and, in particular, it is possible to adopt a polymerization-in-emulsion proces according to the operative techniques mentioned hereinabove for copolymer A. Fluoroelastomer C shall have, for the most widely used commercial products, an inherent viscosity between 0.2 and 1.5 dl/g. The Mooney viscosity will range, in most cases, from 50 to 150, operating at 100° C. with rotor L according to the standards mentioned hereinabove.

The vulcanizable fluoroelastomeric compositions according to the present invention, both those based on a mixture of copolymer A and of copolymer B (first method) and those based on fluoroelastomer C only (second method), are preparable by using additives of a known type as vulcanizers, vulcanization accelerators, acid acceptors, etc.

Thus, a fluoroelastomeric composition conforming to this invention essentially comprises:

(1) 100 parts by weight of a mixture of copolymer type A (from 1.3 to 30% by weight) and of copolymer type B (from 98.7 to 70% by weight), or 100 parts by weight of fluoroelastomer type C;
(2) 1 to 40 parts by weight of an acceptor of inorganic acids, which consists in at least a basic oxide of a divalent metal, such as magnesium oxide, calcium oxide, lead oxide;
(3) 0.5 to 10 parts by weight of at least a basic hydroxide such as, for example calcium hydroxide, strontium hydroxide or barium hydroxide and/or salts of weak acids of alkaline or alkaline-earth metals such as, e.g., calcium, strontium, barium, sodium, potassium carbonates, benzoates and phosphates;
(4) an aromatic polyhydroxyl cross-linking agent such as, for example, hydroquinone, hexafluoro-isopropylidene-bis-(4-hydroxy-benzene);
(5) a vulcanization accelerator having the structure of a quaternary compound of nitrogen, of phosphorus, of arsenic and of antimony in an amount ranging from 0.2 to 3 parts, as described in the following patents:
GB No. 1,356,344 (Du Pont), ammonium salts
U.S. Pat. No. 3,876,654 (Du Pont), phosphonium salts
U.S. Pat. No. 3,655,727 (EM), ammonium salts
U.S. Pat. No. 3,752,787 (Du Pont), phosphoranes
GB No. 2,010,285 (ME), amino-phosphonium salts.

Compounds which are particularly useful for this invention are 1-tetrafluoroborate-1-benzyl-N,N',N''-hexamethyl-phosphoranetriamine, 1-chloro-1,1-diphenyl-1-benzyl-N-diethyl-phosphoranamine (prepared according to what is described in J.A.C.S. 84 5794 (1960)). Preparation of the mixes can be accomplished by operating as is described in the above-cited patents. The polymeric compositions according to the invention can be vulcanized also with conventional vulcanizing systems. When it is desired to utilize vulcanizing systems based on organic peroxides, the fluoroelastomeric polymers according to the present invention can be properly modified by introducing into the polymeric chain small amounts of a brominated comonomer, such as $BrCF_2-CF_2-O-CF=CF_2$, in order to have in the fluoroelastomer from 0.1 to 1.5% by weight of Br.

The preparation of a few copolymers employed for preparing the elastomeric compositions forming the object of the present invention is exemplified hereinafter.

COPOLYMER A.1

3.4 l of water were introduced into a 5-liter autoclave equipped with a mechanical stirrer. It was heated to 80° C. whereafter, by means of a compressor, a mixture coming from a gasholder and having the following composition by weight was introduced into the autoclave:

vinylidene fluoride (VDF) 22.5% hexafluoropropene (PFP) 37.0%, chlorotrifluoro-ethylene (CTFE) 34.5%, till reaching a pressure of 12 atm. gauge. 100 ml of an aqueous solution containing 10 g of ammonium persulphate were fed.

As the pressure decreased to 0.5 kg/cm$^2$ gauge, it was started again feeding the same gaseous composition contained in another gasholder and having the following by weight composition: VDF=59.7%, CTFE=21.7%, PFP=18.6%, in order to maintain a constant pressure of 12 kg/cm$^2$ gauge in the autoclave. After 80 minutes, 380 normal liters of monomers were consumed; stirring was stopped, the residual gases were discharged and the latex was collected, which was coagulated with aluminium sulphate and washed with water. The polymer, dried at 60° C., exhibited a Mooney viscosity of 74—ML1+4 (100° C.) (ASTM.D 1646). Its composition in monomeric units was practically corresponding to the one of the mixture of the second gasholder.

COPOLYMER A.2

It was prepared according to the procedure described for elastomer 1, the mixture in the first gasholder having the following by weight composition: VDF=24.4%, PFP=15%, CTFE=60.6%, and the mixture in the second gasholder, the following composition: VDF=50.8%, CTFE=42%, PFP=7.2%.

The polymer composition expressed in monomeric units was practically like that of the monomeric mixture coming from the second vessel. The Mooney viscosity was 76—ML1+4 (100° C.).

COPOLYMER A.3

Always operating as is described hereinbefore, but with a by weight composition in the first gasholder of: VDF=35.5%, CFTE=64.5%, and in the second gasholder of: VDF=56.2%, CTFE=43.8%, a copolymer was obtained, which had a composition practically like that of the mixture fed from the second gasholder and a Mooney viscosity of 80—ML1+4 (10° C.).

COPOLYMER A.4

Always operating as described hereinabove, but with a by weight composition in the first gasholder of VDF=20.4%, CTFE=15.9%, PFP=54.6%, TFE=9.1%, and in the second gasholder: VDF=39.0%, CTFE=19.4%, PFP=25%, TFE=16.6%, a copolymer was obtained, whose composition was practically like that of the mixture fed from the second gasholder.

The Mooney viscosity was 82−ML1+4 (100° C.).

ELASTOMER B.1

It was prepared by operating as is described for copolymer A.1 with a gaseous feeding mixture of VDF+PFP in gasholder 1 and in gasholder 2 in a VDF/PFP weight ratio of 0.43 and 1.7, respectively.

An elastomer was obtained having a by weight composition of about 36.9% of PFP and 63.1% of VDF, and a Mooney viscosity of 85−ML1+4 (100° C.).

ELASTOMER B.2

This terpolymer based ob VDF+PFP+TFE was prepared by operating in like manner as for copolymer B.1 with a feeding gaseous composition VDF/PFP/TFE from the second gasholder in a weight ratio of 43.5/33.9/22.6 and from the first gasholder of 33.8/39.7/26.5.

The obtained polymer had the following by weight composition: VDF=43.5%, PFP=33.9%, TFE=22.6%, and a Mooney viscosity=88−PL1+4 (100° C.).

EXAMPLES 1-8 (Table I)

The examples of Table I as well as the successive ones are given in order to illustrate the characteristics of the vulcanizates obtained from the mixtures of elastomeric copolymers according to the invention. All the indicated amounts are amounts by weight, unless otherwise specified.

In the tables there are indicated the formulations employed, in which there are contained the fluoroelastomers prepared as described hereinabove, namely: composition 1 comprises a mixture of 6.7 parts by weight of copolymer A.1 and 93.3 parts by weight of elastomer B.1; compositions 2 comprises a mixture of 13.4 parts by weight of copolymer A.1 and 86.6 parts by weight of elastomer B.1; composition 3 comprises 26.8% by weight of A.1 and 73.2% by weight of elastomer B.1.; composition 4 is composed of a mixture of copolymer A.2 (6.7% by weight) and of elastomer B.1 (93.3% by weight); composition 5 consists of a mixture of copolymer A.2 (26.8% by weight) and of elastomer B.1 (73.2% by weight); composition 6 consists of a mixture of copolymer A.3 (6.7% by weight) and of elastomer B.1 (93.3% by weight), while composition 7 comprises a mixture of copolymer A.3 (13.4% by weight) and of elastomer B.1 (86.6% by weight).

Accelerator 1 is 1-tetrafluoroborate-1-benzyl-N,N',N''-hexamethyl-phosphoranetriamine.

To evaluate the adhesion between vulcanized elastomeric composition and metal, standard ASTM D 816, method B—"Adhesion strength in shear" was utilized, since the methods based on peeling or stripping measures are also bound to the rubber's tearing resistance.

Specimens in the form of sandwiches, as schematically shown in FIG. 1 (wherein: M=metal, G=rubber, A=adhesive), were prepared. The small metal plates (carbon steel UNI Fe 37 A, dimensions: 80×25×2 mm) were degreased in a vapor bath of Algofrene 113 (1.1.2-trichloro-trifluoroethane) and sandblasted with corundum granulometry=0.01 mm) in the adhesion areas, then degreased once again. The adhesive was applied by spraying onto the portion intended for adhesion.

As an adhesive, Chemosil 511, a trademark of Henkel, was used.

The adhesion between the plates treated with the adhesive and the elastomer occurred during the vulcanization-in-press step. The overlapping surface was of about 625 mm$^2$ (rubber thickness=3.8 mm).

Molding conditions:
P=60–70 kg/cm$^2$
T=170±2° C.

The time was a function of the accelerator concentration and of the CTFE content.

The specimens so prepared were subjected to tensile strength at a speed of 50 mm/min. The adhesion resistance was evaluated after vulcanization in press, after post-vulcanization in oven at 250° C. and after post-vulcanization at 250° C. followed by treatment in boiling water.

In the cases in which breaking of the joint occurred through the rubber, the adhesion resistance was considered to be higher than the measured value.

All the mechanical tests are referred to a temperature of 23° C.

TABLE 1

| | | EXAMPLES | | | | | | | |
|---|---|---|---|---|---|---|---|---|---|
| | | 1 | 2 | 3 | 4 | 5 | 6 | 7 | 8 |
| Elastomer B.1 | p.b. weight | 100 | | | | | | | |
| Composition 1 | " | | 100 | | | | | | |
| Composition 2 | " | | | 100 | | | | | |
| Composition 3 | " | | | | 100 | | | | |
| Composition 4 | " | | | | | 100 | | | |
| Composition 5 | " | | | | | | 100 | | |
| Composition 6 | " | | | | | | | 100 | |
| Composition 7 | " | | | | | | | | 100 |
| Bisphenol AF | | 1,8 | 1,8 | 1,8 | 1,8 | 1,8 | 1,8 | 1,8 | 1,8 |
| Accelerator 1 | | 0,350 | 0,350 | 0,350 | 0,350 | 0,350 | 0,350 | 0,350 | 0,350 |
| Maglite DE (MgO) | " | 5 | 5 | 5 | 5 | 5 | 5 | 5 | 5 |
| Ca(OH)$_2$ | " | 5 | 5 | 5 | 5 | 5 | 5 | 5 | 5 |
| Carbon black MT | " | 25 | 25 | 25 | 25 | 25 | 25 | 25 | 25 |
| Thermomechanical characteristics O.D.P. at 175° C. (1) | | | | | | | | | |
| Minimum torque (lb. in.) | | 12 | 12 | 13 | 13 | 12 | 13 | 13 | 12 |
| Ts 2 (min.) | | 2.7 | 3.1 | 3.4 | 3.5 | 3.2 | 3.8 | 3.3 | 3.6 |
| t' (min.) | | 4.5 | 5.1 | 5.4 | 5.9 | 5.5 | 5.8 | 5.4 | 5.9 |
| Maximum torque (lb. in.) 12 min. | | 102 | 101 | 98 | 85 | 96 | 82 | 92 | 84 |
| Vulcanizate Adhesion (kg/cm$^2$) (2) | | | | | | | | | |
| After vulcanization in press | | 7 | 27 | 46 | 53 | 47 | 51 | 48 | 55 |

TABLE 1-continued

|  | EXAMPLES | | | | | | | |
| --- | --- | --- | --- | --- | --- | --- | --- | --- |
|  | 1 | 2 | 3 | 4 | 5 | 6 | 7 | 8 |
| at 175° C. × 8 minutes |  |  |  |  |  |  |  |  |
| After post-vulcanization in oven at 250° C. × 16 hours | 15 | 22 | 25 | 46 | 26 | 38 | 27 | 44 |

(1) According to ASTM D 2084
(2) According to ASTM D 816 - method B

EXAMPLES 9–12 (Table 2)

Composition 8 comprised 6.7% by weight of copolymer A.4 and 93.3% of elastomer B.2.

Composition 9 comprised 13.4% by weight of copolymer A.4 and 93.3% of elastomer B.2.

Composition 10 consisted of 26.8 parts by weight of copolymer A.4 and of 73.2 parts by weight of elastomer B.2.

Accelerator 2 was 1-chloro-1,1-diphenyl-1-benzyl-N-diethylphosphoranamine.

TABLE 2

|  |  | EXAMPLES | | | |
| --- | --- | --- | --- | --- | --- |
|  |  | 9 | 10 | 11 | 12 |
| Elastomer B.2 | p.b. weight | 100 |  |  |  |
| Composition | " |  | 100 |  |  |
| Composition | " |  |  | 100 |  |
| Composition | " |  |  |  | 100 |
| Bisphenol AF |  | 1,6 | 1,6 | 1,6 | 1,6 |
| Accelerator 1 |  | 0,550 | 0,550 | 0,550 | 0,550 |
| Maglite DE (MgO) | " | 5 | 5 | 5 | 5 |
| Ca(OH)$_2$ | " | 5 | 5 | 5 | 5 |
| Carbon black MT | " | 25 | 25 | 25 | 25 |
| Thermomechanical characteristics O.D.R. at 175° C. (1) |  |  |  |  |  |
| Minimum torque (lb. in.) |  | 22 | 22 | 23 | 25 |
| Ts 2 (min.) |  | 3.1 | 3.4 | 3.6 | 3.8 |
| t' (50) (min.) |  | 4.0 | 4.4 | 4.6 | 4.9 |
| Maximum torque (lb. in.) |  | 132 | 121 | 115 | 108 |
| Vulcanizate Adhesion (kg/cm$^2$) (2) |  |  |  |  |  |
| After vulcanization in press at 175° C. × 8 minutes |  | 6 | 31 | 36 | 43 |
| After post-vulcanization in oven at 250° C. × 16 hours |  | 13 | 21 | 25 | 36 |

(1) See note in Table 1
(2) See note in Table 1

The preparation of elastomers type C will be now described.

ELASTOMER C.1

3.4 l of water were charged into a 5-liter autoclave equipped with a mechanical stirrer. Hexafluoropropene was introduced by means of autogenous pressure in such way as to cause the pressure inside the autoclave to reach 5 atm.

Now it was heated by means of a compressor, and a mixture coming from a gasholder and having the following composition by weight was introduced: vinylidene fluoride (VDF)=62.5%, hexafluoropropene (PFP)=36.1%, chlorotrifluoro-ethylene (CTFE)=1.4%, till reaching a pressure of 12 kg/cm$^2$ gauge. 100 ml of an aqueous solution containing 10 g of ammonium persulphate were fed. As the pressure decreased to 0.5 kg/cm$^2$ gauge, it was started again feeding the same gaseous composition contained in the gasholder in order to maintain a constant pressure of 12 kg/cm$^2$ gauge in the autoclave. After 80 minutes, 380 normal liters of monomer were consumed; stirring was stopped, the residual gases were discharged and the latex was collected, which was coagulated with aluminium sulphate and washed with water. The polymer, dried at 60° C., exhibited a Mooney viscosity of 76−ML1+4 (100° C. (ASTM D 1646). Its composition in monomeric units was practically corresponding to the one of the mixture in the gasholder.

ELASTOMER C.2

It was prepared according to the procedure described for elastomer C.1, the mixture in the gasholder having the following composition: VDF=62.1%, PFP=35.0%, CTFE=2.9%

The polymer composition expressed in monomeric units was the same of the fed monomeric mixture.

Mooney viscosity was 74−ML1+4 (100° C.).

ELASTOMER C.3

Always operating as is described hereinbefore, but with a monomer composition corresponding by weight to VDF=62.5%, PFP=35.4%, CTFE=2.1% and an ammonium persulphate content of 8 g, a copolymer was obtained having a composition practically equal to the one of the fed mixture and a Mooney viscosity of 78−ML+14 (100° C.).

ELASTOMER C.4

It was obtained by operating analogously with what is described for elastomer C.3, but with the following by weight composition of the fed mixture: VDF=60.3%, PFP=34.7%, CTFE=5.0%. Polymerization was conducted at 15 atm.

Mooney viscosity=72−ML1+4 (100°C.).

ELASTOMER C.5

It was obtained in like manner as is described hereinbefore.

Composition by weight: VDF= 64.4%, PFP=28.3%, CTFE=7.3%.

Mooney viscosity=70−ML +14 (100°C.).

ELASTOMER 6 (comparative)

it was prepared by operating as for elastomer C.1, with a gaseous feeding mixture having a VDF/PFP by weight rapid=1.71 and in the absence of CTFE.

The resulting polymer had this by weight composition: VDF=63.1%, PFP=36.9%, and a Mooney viscosity=78—ML 1+4 (100° C.).

EXAMPLES 13–24 (TABLE 3) and 25–30 (TABLE 4)

These examples as well as the successive ones are given in order to illustrate the characteristics of the vulcanizates obtained from elastomers type C according to the invention. All the indicated amounts are by weight, unless otherwise specified.

In the tables there are indicated the formulations employed, in which there are contained the fluoroelastomers prepared as described hereinbefore, namely elastomers C.1, C.2, C.3, C.4 and C.5 according to the invention, and elastomer 6 according to the art; by way of comparison.

The adhesion between vulcanized elastomer and metal was evaluated according to the method described for examples 1–8.

TABLE 3

| | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Elastomer C.1 | by weight | 100 | 100 | 100 | 100 | — | — | — | — | — | — | — | — |
| Elastomer C.2 | " | — | — | — | — | 100 | 100 | 100 | 100 | — | — | — | — |
| Elastomer 6 | " | — | — | — | — | — | — | — | — | 100 | 100 | 100 | 100 |
| Maglite De (MgO) | " | 5 | 5 | 5 | 5 | 5 | 5 | 5 | 5 | 5 | 5 | 5 | 5 |
| Ca(OH)$_2$ | " | 5 | 5 | 5 | 5 | 5 | 5 | 5 | 5 | 5 | 5 | 5 | 5 |
| Carbon black Mt | " | 25 | 25 | 25 | 25 | 25 | 25 | 25 | 25 | 25 | 25 | 25 | 25 |
| Bisphenol AF | " | 1,8 | 1,8 | 1,8 | 1,8 | 1,8 | 1,8 | 1,8 | 1,8 | 1,8 | 1,8 | 1,8 | 1,8 |
| Accelerator 1 (as in examples 1–8) | " | 0,250 | 0,300 | 0,350 | 0,450 | 0,250 | 0,300 | 0,350 | 0,450 | 0,250 | 0,300 | 0,350 | 0,4500 |
| Thermomechanical characteristics O.D.R. at 175° C. (1) | | | | | | | | | | | | | |
| Minimum torque in. lb | | 12 | 10 | 11 | 13 | 14 | 12 | 12 | 8 | 9 | 9 | 9 | 10 |
| T$_s$ (2) minutes | | 4,2 | 3,7 | 3,4 | 2,9 | 3,5 | 3,0 | 2,7 | 2,4 | 4,6 | 3,2 | 3,1 | 2,2 |
| t'$_c$ (50) minutes | | 9,7 | 6,2 | 6,5 | 3,4 | 7,0 | 5,7 | 4,9 | 4,2 | 8,9 | 5,4 | 4,9 | 3,2 |
| Maximum torque in. lb | | 68 | 83 | 87 | 91 | 70 | 86 | 88 | 84 | 88 | 88 | 94 | 100 |
| Mooney viscosity MS at 121° C. (2) | | | | | | | | | | | | | |
| minimum value: | | 43 | 42 | 40 | 38 | 44 | 47 | 40 | 37 | 55 | 52 | 50 | 46 |
| minutes for an increase by 10 points (t10): | | 50 | 48 | 44 | 40 | 45 | 42 | 38 | 36 | 60 | 58 | 55 | 45 |
| Vulcanization in press 170° C. × 10 minutes in oven 250° C. × 16 hours | | | | | | | | | | | | | |
| Modulus at 100% elong. kg/cm$^2$ (3) | | 42 | 43 | 48 | 55 | 43 | 46 | 50 | 55 | 44 | 48 | 58 | 67 |
| Tensile strength kg/cm$^2$ (3) | | 155 | 162 | 161 | 158 | 170 | 175 | 171 | 165 | 163 | 157 | 147 | 166 |
| Elongation at break % (3) | | 190 | 210 | 209 | 195 | 195 | 205 | 200 | 195 | 193 | 179 | 163 | 178 |
| Hardness, IRHD (4) | | 67 | 67 | 69 | 71 | 68 | 70 | 70 | 71 | 71 | 72 | 74 | 75 |
| Compression set O-rings (φ 25.4 × 3.53 mm) (5) 200° C. × 70 hours | | 19 | 20 | 22 | 23 | 18 | 20 | 21 | 21 | 17 | 19 | 20 | 21 |
| Vulcanizate Adhesion (6) kg/cm$^2$: | | | | | | | | | | | | | |
| After vulcanization in press at 175° C. × 8 minutes | | 50 | 45 | 39 | 29 | >50 | >55 | 70 | 49 | 24 | 11 | 10 | 6 |
| After post-vulcanization in oven at 250° C. × 16 hours | | 41 | 40 | 27 | 24 | >53 | >57 | 43 | 41 | 25 | 23 | 27 | 15 |
| After thermal ageing at 250° C. × 16 hours and aqueous treatment at 100° C. × 48 hours | | 32 | 31 | 30 | 20 | >47 | >53 | 36 | 40 | 21 | 19 | 23 | 16 |

(1) according to ASTM D 2084
(2) according to ASTM D 1646
(3) according to ASTM D 412 on 2 mm thickness
(4) according to ASTM D 1415 on 6 mm thick specimens
(5) according to ASTM D 395 method B
(6) according to ASTM D 816 method B

TABLE 4

| | | Example | | | | | |
|---|---|---|---|---|---|---|---|
| | | 25 | 26 | 27 | 28 | 29 | 30 |
| Elastomer C.3 | by weight | 100 | 100 | 100 | 100 | — | — |
| Elastomer C.4 | " | — | — | — | — | 100 | — |
| Elastomer C.5 | " | — | — | — | — | — | 100 |
| Maglite De (MgO) | " | 5 | 5 | 5 | 5 | 5 | 5 |
| Ca(OH)$_2$ | " | 5 | 5 | 5 | 5 | 5 | 5 |
| Carbon black Mt | " | 25 | 25 | 25 | 25 | 25 | 25 |
| Bisphenol AF | " | 1,8 | 1,8 | 1,8 | 1,8 | 1,8 | 1,8 |
| Accelerator 1 (as in examples 1–8) | " | 0,250 | 0,300 | 0,350 | 0,400 | 0,400 | 0,400 |
| Thermomechanical characteristics O.D.R. at 175° C. (1) | | | | | | | |
| Minimum torque in. lb | | 6,5 | 7 | 7,5 | 6,5 | 6 | 6 |
| T$_s$ (2) minutes | | 5,0 | 4 | 3,5 | 2,6 | 4,5 | 5,5 |
| T'$_c$ (50) minutes | | 14,1 | 8,6 | 7,0 | 5,0 | 10,2 | 19,7 |
| Maximum torque in. lb | | 73 | 76 | 80 | 84 | 80 | 79 |
| Mooney viscosity MS at 121° C. (2) | | | | | | | |
| minimum value: | | 41 | 40 | 38 | 34 | 35 | 33 |
| minutes for an increase by 10 points (t10): | | 47 | 45 | 43 | 38 | 37 | 30 |
| Vulcanization in press 170° C. × 10 minutes in oven 250° C. × 16 hours | | | | | | | |
| Modulus at 100% elong. kg/cm$^2$ (3) | | 50 | 55 | 58 | 62 | 52 | 44 |
| Tensile strength kg/cm$^2$ (3) | | 158 | 160 | 168 | 178 | 148 | 123 |

TABLE 4-continued

|  | Example | | | | | |
|---|---|---|---|---|---|---|
|  | 25 | 26 | 27 | 28 | 29 | 30 |
| Elongation at break % (3) | 180 | 185 | 187 | 191 | 231 | 226 |
| Hardness, IHRD (4) | 66 | 67 | 68 | 68 | 69 | 69 |
| Compression set |  |  |  |  |  |  |
| O-rings (φ 25.4 × 3.53 mm) (5) | 20 | 22 | 23 | 25 | 26 | 26 |
| 200° C. × 70 hours |  |  |  |  |  |  |
| Vulcanizate |  |  |  |  |  |  |
| Adhesion (6) kg/cm²: |  |  |  |  |  |  |
| After vulcanization in press at 175° C. × 8 minutes | >58* | >56* | >58 | >50 | >58 | >43 |
| After post-vulcanization in oven at 250° C. × 16 hours | >52 | >37 | >41 | >45 | >43 | >31 |
| After thermal ageing at 250° C. × 16 hours and aqueous treatment at 100° C. × 48 hours | >44 | >35 | >37 | >37 | >31 | >56 |

(1) according to ASTM D 2084
(2) according to ASTM D 1646
(3) according to ASTM D 412 on 2 mm thickness
(4) according to ASTM D 1415 on 6 mm thick specimens
(5) according to ASTM D 395 method B
(6) according to ASTM D 816 method B
*vulcanization in press at 170° C., 15 minutes.

EXAMPLES 31 to 36

These examples evidence how elastomers type C.1 prepared according to the present invention permit to obtain a good adhesion also when the fluorine content of the copolymer is high, up to 69% by weight approximately.

As is known, the stability of the fluoroelastomers based on vinylidene fluoride to the organic solvents is highly dependent on the fluorine content (L. D. Albin, Rubb. Chem. Technol. 55, page 903 (1982)). The values of adhesion to metal, of chemical stability and of behavior to low temperatures, evaluating the last value as Tg or glass transition temperature (method DSC with dT/dt=10° C./ min. and brittle point (ASTM D 746) were compared between polymers according to the present invention and polymers according to the art having an equal flurine content (about 69% by weight), a different composition, and always having 1.5% by moles of CTFE corresponding to 1.5-1.9 % by weight, depending on the composition.

Elastomer C.7 was prepared in like manner as elastomer C.1 and exhibited the following by weight composition: (Tg= —4.0° C.)
$C_2H_2F_2$: 36.4%
$C_3F_6$: 35.7%
$C_2F_4$: 26.0%
$C_2ClF_3$: 1.9%

Elastomer C.8 was prepared according to what is described in U.S. Pat. No. 4,032,699 and had the following by weight composition: (Tg= —4.5° C.)
$C_2H_2F_2$: 20.5%
$C_3F_6$: 78.0%
$C_2ClF_3$: 1.5 %

Reference elastomer 9 was prepared as elastomer C.7 without $C_2ClF_3$; the composition by weight was the following: (Tg= —5.0° C.)
$C_2H_2F_2$: 37.1%
$C_3F_6$: 36.4%
$C_2F_4$: 26.5%

TABLE 5

|  |  | Example | | | | | |
|---|---|---|---|---|---|---|---|
|  |  | 31 | 32 | 33 | 34 | 35 | 36 |
| Elastomer C.7 | by weight | 100 | 100 | — | — | — | — |
| Elastomer C.8 | " | — | — | 100 | 100 | — | — |
| Elastomer 9 | " | — | — | — | — | 100 | 100 |
| Maglite De (MgO) | " | 3 | 3 | 3 | 3 | 3 | 3 |
| Ca(OH)₂ | " | 6 | 6 | 6 | 6 | 6 | 6 |
| Carbon black Mt | " | 30 | 30 | 30 | 30 | 30 | 30 |
| Bisphenol AF | " | 2,7 | 2,7 | 2,7 | 2,7 | 2,7 | 2,7 |
| Accelerator 1 (as in examples 1-8) | " | 0,9 | 1,1 | 0,9 | 1,1 | 0,9 | 1,1 |
| Vulcanization |  |  |  |  |  |  |  |
| in press 170° C. × 10 minutes |  |  |  |  |  |  |  |
| in oven 250° C. × 16 hours |  |  |  |  |  |  |  |
| Modulus at 100% elong. kg/cm² (3) |  | 58 | 58 | 60 | 61 | 55 | 55 |
| Tensile strength kg/cm² (3) |  | 135 | 140 | 120 | 130 | 155 | 160 |
| Elongation at break % (3) |  | 220 | 225 | 246 | 245 | 235 | 230 |
| Hardness, IHRD (4) |  | 75 | 77 | 83 | 77 | 74 | 75 |
| Compression set |  |  |  |  |  |  |  |
| O-rings (φ 25.4 × 3.53 mm) (4) |  | 25 | 27 | 26 | 28 | 36 | 38 |
| 200° C. × 70 hours |  |  |  |  |  |  |  |
| Brittle point (8) °C. |  | —37 | —37 | —7 | 7 | —38 | —38 |
| Chemical Stability (7) |  | 5,1 | 4,8 | 4,8 | 4,2 | 4,5 | 4,3 |
| Toluene 25° C. × 70 hours |  |  |  |  |  |  |  |
| Stauffer blend 7700 |  | 11,5 | 11 | 10,9 | 10,2 | 10,1 | 9,8 |
| 200° C. × 70 hours |  |  |  |  |  |  |  |
| Adhesion (6) kg/cm²: |  |  |  |  |  |  |  |
| After vulcanization in press at 175° C. × 8 minutes |  | >51 | >46 | 23 | 25 | 21 | 24 |
| After post-vulcanization in oven |  | >46 | >42 | 21 | 23 | 22 | 23 |

TABLE 5-continued

| | Example | | | | | |
|---|---|---|---|---|---|---|
| | 31 | 32 | 33 | 34 | 35 | 36 |
| at 250° C. × 16 hours | | | | | | |
| After thermal ageing at 250° C. × 16 hours and aqueous treatment at 100° C. × 48 hours | >40 | >39 | 15 | 14 | 14 | 16 |

(3) according to ASTM D 412 - on 2 mm specimens
(4) according to ASTM D 1415 - on 6 mm thick specimens
(5) according to ASTM D 395 method B
(6) according to ASTM D 816 method B
(7) according to ASTM D 417 - i numbers indicate the % by weight of swelling
(8) according to ASTM D 746

In the accompanying drawing, FIG. 1 is a schematic showing of a specimen sandwich subjected to tests as described herein and in which M is a metal plate, G is rubber and A is an adhesive.

We claim:

1. Vulcanizable fluoroelastomeric compositions having, in the vulcanized state, a high adhesion to metals, comprising a polymer comprising vinylidene fluoride and chlorotrifluoroethylene, said polymer being present as:

I. an elastomeric mixture consisting essentially of:
(A) 1.3 to 30 parts of a copolymer (A) comprising, by weight, from 6% to 81% of chlorotrifluoroethylene; from 18% to 71% of vinylidene fluoride; from 0% to 41% of hexafluoropropene; and from 0 to 49% of tetrafluoroethylene; and
(B) 98.7 to 70 parts by weight of an elastomeric copolymer (B) consisting essentially of, by weight: from 26% to 72% of vinylidene fluoride; from 25% to 44% of hexafluoropropene, and from 0% to 36% of tetrafluoroethylene II. a fluoroelastomeric copolymer (C) consisting essentially of, by weight, from 37% to 73% of vinylidene fluoride, from 22% to 41% of hexafluoropropene; from 0.6% to 7.5% of chlorotrifluoroethylene; from 0% to 37% of tetrafluoroethylene, characterized in that the total amount of chlorotrifluoroethylene units is in the range 1% to 10% by weight, calculated on the total.

2. A composition according to claim 1, characterized in that the total amount of chlorotrifluoroethylene in polymer (A) is from 1% to 3.8% by weight.

3. A composition according to claim 1, characterized in that the total amount of chlorotrifluoroethylene in the mixture (B) is from 1% to 2.7% by weight.

4. Vulcanized articles prepared from fluoroelastomeric compositions according to claim 1.

* * * * *